No. 647,900. Patented Apr. 17, 1900.
A. W. McCURDY.
APPARATUS FOR DEVELOPING PHOTOGRAPHIC ROLL FILMS.
(Application filed Apr. 4, 1899.)

(No Model.) 7 Sheets—Sheet 1.

No. 647,900. Patented Apr. 17, 1900.
A. W. McCURDY.
APPARATUS FOR DEVELOPING PHOTOGRAPHIC ROLL FILMS.
(Application filed Apr. 4, 1899.)
(No Model.) 7 Sheets—Sheet 2.

Fig. 2.

Witnesses
C. C. Burdine.
J. M. Pond.

Inventor:
Arthur W. McCurdy,
by Dodge and Sons,
Attorneys

No. 647,900. Patented Apr. 17, 1900.
A. W. McCURDY.
APPARATUS FOR DEVELOPING PHOTOGRAPHIC ROLL FILMS.
(Application filed Apr. 4, 1899.)
(No Model.) 7 Sheets—Sheet 3.

Witnesses

Inventor:
Arthur W. McCurdy,
by Dodge and Sons,
Attorneys.

No. 647,900. Patented Apr. 17, 1900.
A. W. McCURDY.
APPARATUS FOR DEVELOPING PHOTOGRAPHIC ROLL FILMS.
(Application filed Apr. 4, 1899.)
(No Model.) 7 Sheets—Sheet 4.

Witnesses
C. C. Bindine
J. M. Pond

Inventor:
Arthur W. McCurdy,
by Dodge and Son,
Attorneys.

No. 647,900. Patented Apr. 17, 1900.
A. W. McCURDY.
APPARATUS FOR DEVELOPING PHOTOGRAPHIC ROLL FILMS.
(Application filed Apr. 4, 1899.)
(No Model.) 7 Sheets—Sheet 5.

No. 647,900. Patented Apr. 17, 1900.
A. W. McCURDY.
APPARATUS FOR DEVELOPING PHOTOGRAPHIC ROLL FILMS.
(Application filed Apr. 4, 1899.)
(No Model.) 7 Sheets—Sheet 6.

UNITED STATES PATENT OFFICE.

ARTHUR W. McCURDY, OF WASHINGTON, DISTRICT OF COLUMBIA.

APPARATUS FOR DEVELOPING PHOTOGRAPHIC ROLL-FILMS.

SPECIFICATION forming part of Letters Patent No. 647,900, dated April 17, 1900.

Application filed April 4, 1899. Serial No. 711,723. (No model.)

*To all whom it may concern:*

Be it known that I, ARTHUR W. MCCURDY, a citizen of Great Britain, residing at Washington, in the District of Columbia, have invented certain new and useful Improvements in Apparatus for Developing Photographic Films, of which the following is a specification.

My present invention pertains to an improved apparatus for developing photographic films.

The apparatus or mechanism is shown in the annexed drawings, wherein—

The object of my invention is to provide a compact portable apparatus in which a photographic film may be placed, developed, and treated without the use of a dark room and without the necessity of opening the box of closure during the various steps of developing and fixing the film.

It will also be noted from the description of the apparatus which follows that it is absolutely unnecessary for the operator to touch the film after it has once been placed in the box and the cover thereof closed down until it is ready for drying, the entire manipulation being effected from without the box or receptacle, leaving the operator free from the confinement of a dark room and in full enjoyment of light and air, and free to attend to other matters without danger of injury to the film undergoing treatment.

With the apparatus shown in the accompanying drawings and hereinafter described a continuous film may be unwound from a "cartridge" onto a flexible apron or carrier, which apron, with the film thereon, is wound about itself in such manner that the sensitized face of the film is exposed to the reagents in the box, while at the same time this surface is held out of contact with any portion of the apparatus or itself. The apparatus is so constructed and arranged that the apron or carrier, with the film supported thereon, may be wound first in one direction about itself and then in the reverse direction about itself, so that all portions of the film and each separate exposure thereon may be readily viewed as it is brought uppermost or in line with the inspection-opening formed in the box. This operation of winding first upon one axle or support and then upon the other may be carried on so long as desired, the film being at all times held taut, with its sensitized face out of contact with any portion of the device or itself.

While the apparatus hereinafter set forth and illustrated in the accompanying drawings is the preferred form of my invention, I do not desire to limit myself strictly thereto, as I have made and used successfully other embodiments of the underlying principle or method involved—namely, placing a cartridge or continuous film wholly within a closure, starting the outer covering or protecting envelop therefrom, sealing the box or closure, and unwinding the film and developing and fixing the same without opening the box or placing the hands therein to manipulate the film during the various steps of the process, and I desire to be understood as laying claim, broadly, herein to the apparatus whereby this result is attained, the process or method being claimed in my application, Serial No. 729,069, filed on or about the 31st day of August, 1899, said application being a division of this case.

Many advantages present themselves with the process and apparatus about to be described and these will be hereinafter pointed out in detail.

Figure 1:
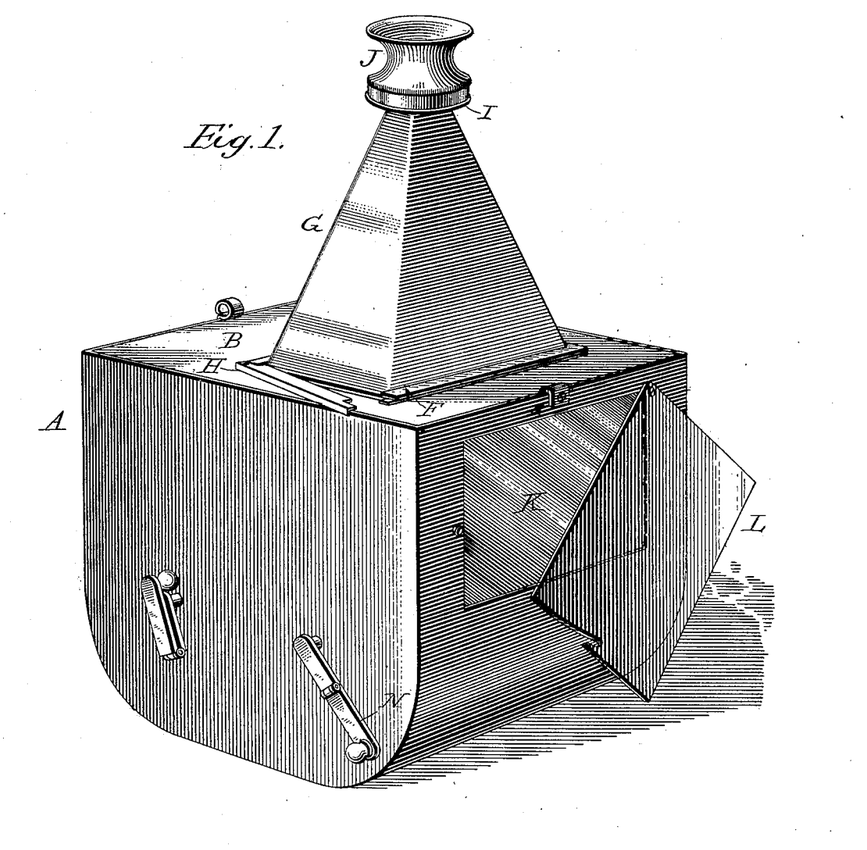
Figure 1 is a perspective view of the apparatus.
Figure 2:
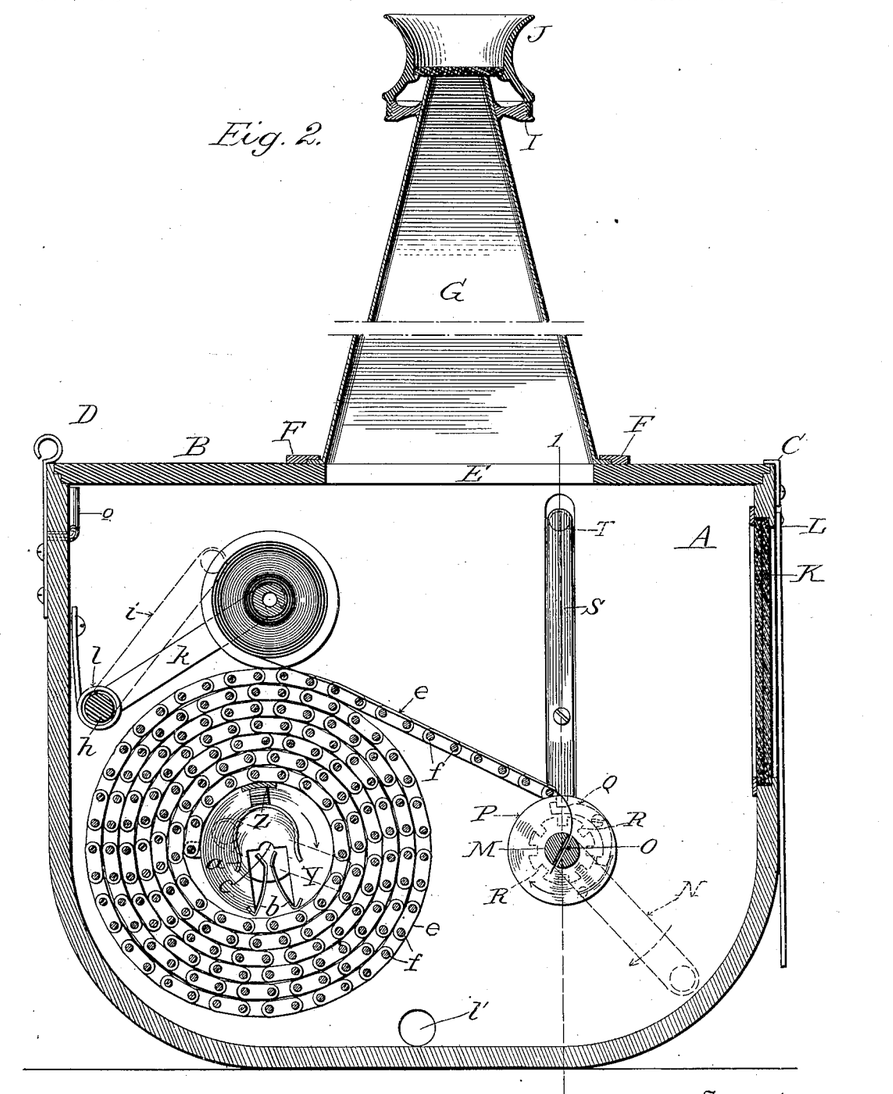
Fig. 2, a longitudinal sectional view.
Figure 3:
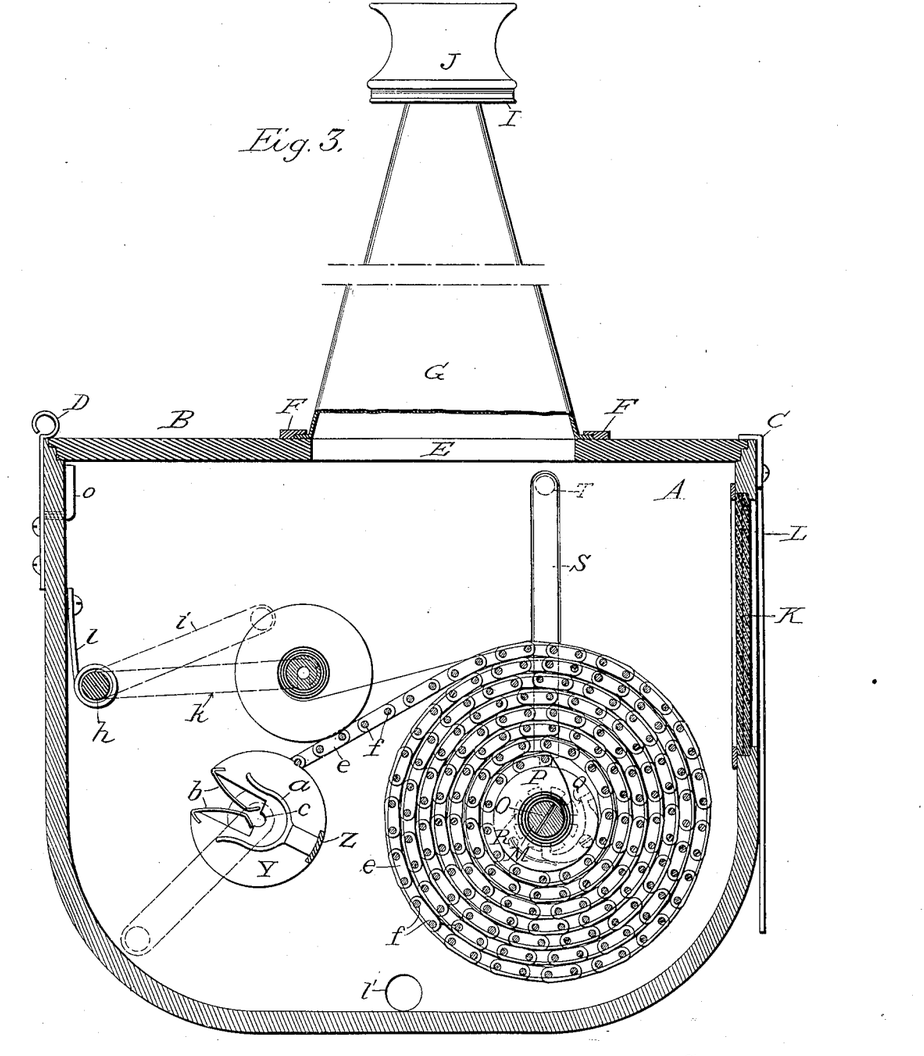
Fig. 3, a similar view, the parts being shown in a different relation.
Figure 4:
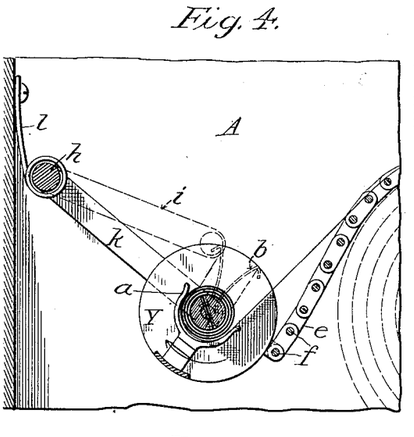
Figs. 4 and 5, detail views illustrating the relation of the film or cartridge holder to the rear support and endless apron or carrier.
Figure 5:
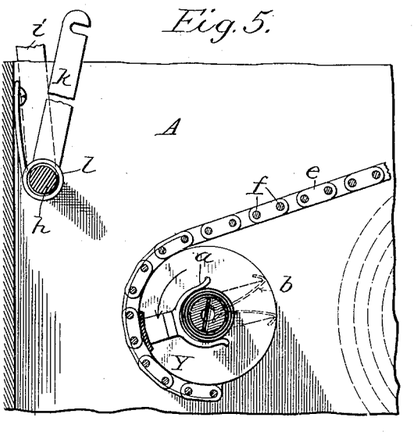

Referring to the drawings, A indicates the body or casing of the apparatus, which is preferably rectangular in cross-section and is formed with two rounding faces near the base, as clearly indicated in Figs. 1, 2, and 3. The upper portion of the apparatus is provided with a removable cover B, mounted in the upper portion of the base in such manner that all actinic rays will be excluded. To hold the cover in place, there is provided at the forward edge of the box a permanent lip or hook C, under which the edge of the cover extends, while upon the rear face of the box there is mounted a spring-catch D. The cover is formed with an elongated opening E, and adjacent to the walls thereof upon the upper side of the cover are placed suitable guides or ways F, which are designed to receive the outturned edges of an inspection-tube G. Upon reference to Fig. 1 it will be seen that after the tube is slipped into place beneath the guides or ways F a hinged arm or member H is swung around to engage with or extend over the outer projecting edge of the tube G. This is to prevent the possibility of any rays of light passing in around the tube. The upper end of the tube is provided with a collar I, and upon this is screwed an eyepiece J, carrying suitable glasses of a nature to cut out those rays of light which injuriously affect the sensitized film. In the form illustrated the tube is rectangular at its base and of such a size that the opening therein registers with the opening E in the cover. The sides of the tube converge as they approach the upper end, as clearly shown in Figs. 1, 2, and 3.

The forward face of the box or casing is provided with an elongated opening or window, in which is mounted a suitable glass or glasses K of a nature similar to those carried by the eyepiece J, which glasses serve to admit light to the interior of the box directly upon the film. By making the opening somewhat elongated and extending it practically across the entire width of the box sufficient light is admitted to enable the operator to see the film across its entire width, and thus watch the development as it proceeds without any difficulty whatsoever. A cover L is hinged at one corner of the opening, as indicated in Fig. 1, and any suitable catch may be employed for holding the cover in its closed position when it is desired to exclude all light.

Throughout the description that side of the box in which the glasses K are mounted will be treated as the forward side of the apparatus for the purpose of clearness in description.

Mounted within the forward portion of the box between the side walls thereof is a shaft M, one end of which extends out through the side of the box and is provided with a crank N. As will be seen upon reference to Figs. 2, 3, and 6, said shaft is provided with a longitudinal slot O. At each end of the shaft and surrounding the same are two heads or disks P, the disk upon the right in Fig. 6 carrying a detent or pawl Q. (Shown in dotted lines in Figs. 2 and 3 and in section in Fig. 6.) Said pawl or detent is provided with a nose adapted to enter one of a series of recesses or notches R, formed upon an enlargement of the shaft M, as shown in the figures just referred to. To actuate said pawl or detent, I provide a sliding plunger S, mounted in a recess formed in the side wall of the box, said sliding plunger being formed with a reduced lower end engaging with a recess or depression formed in one end of the pawl or detent. To actuate the plunger, there is secured to its upper end a handle or knob T, which extends out through a slot formed in the side wall of the casing. To exclude light from passing through the opening in which the handle or knob works, I provide a plate U of such length as to cover the slot or opening at all times, no matter what may be the position of the plunger and its operating knob or handle. The object of this detent and slide is to provide means whereby the shaft M may be rotated by itself or be locked to the head P, causing both the shaft and the head to rotate as one.

To secure sufficient friction between the parts and prevent too-easy actuation thereof, I employ a spring-arm V, which is secured to the inner face of one of the sides and bears against one of the heads P. In the drawings, Fig. 6, this spring-arm is shown as bearing against the head or disk at the left of the apparatus. It is of course preferable to have it bear against this head rather than the other.

Figure 8:
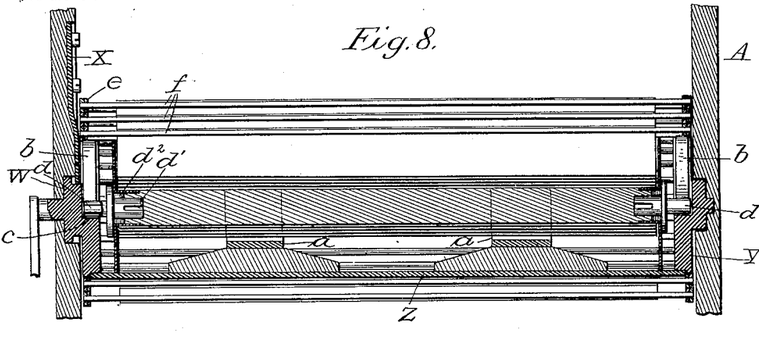
Fig. 8 a vertical sectional view showing the film-spool held in its support.

Mounted within the side wall of the casing at a point in rear of the forward shaft M there is a head or disk W. (Shown most clearly in Figs. 8 and 9.) The head is provided with a projection which extends out through the side wall of the casing and upon which is mounted a crank for imparting motion to the same. An arm X, secured to the inner face of the wall, extends into a groove formed around the reduced portion of the head or disk and serves to hold the same in its proper position. A head Y, similar in its general form to head W, is mounted in the opposite wall of the casing, and said heads W and Y are connected by a cross-bar Z. (See Figs. 2, 3, and 8.) Upon said bar Z are secured two U-shaped spring members $a$, the purpose of which will presently appear. The heads W and Y are each provided with a slot which extends out from the center thereof to the periphery. Extending down into the slot from the periphery of the head or disk are spring-arms $b$, the arms converging as they near the center and then being bent back slightly, as most clearly indicated in Fig. 9. The bottom of the slot, as will also be seen upon reference to said figure, is provided with a depression or recess $c$, which, together with the inturned ends of the spring-arms $b$, serves to form a seat for the end of the stud axle or pin $d$, which is inserted into the end of the spool or cartridge, all of which will be hereinafter more fully set forth.

The endless apron or support for carrying the film is herein shown as composed of two chains connected by a series of cross-bars, the ends of the bars forming the connection between the various links. While I have found this form of apron or support to work well in actual operation, I do not desire to be understood as limiting myself to this particular device, as any form which will afford the necessary support to the film and at the same time when it is wound about itself hold the sensitized face of the film away from the other portions thereof comes within my invention. The form illustrated comprises a series of links $e$, connected to each other and to the corresponding links upon the opposite side of the frame by a series of cross-bars $f$, the ends of said bars being reduced where they pass through the links, and the main body or portion of the bars being of a diameter less than the thickness or height of the links, as will be clearly seen upon reference to Figs. 2 and 3. One end of the apron or support thus formed is connected to the disks P, which are mounted upon the shaft M. The opposite end of said apron is connected to the heads or disks W and Y. As will be seen upon reference to the drawings, the links are in direct alinement with the various heads or disks, and as the apron or support is wound around said heads or disks they will lie directly upon them, and each succeeding layer of links will rest upon the links immediately below it. In this way the cross-bars F do not come into contact with each other or with the links and there is a space left between them upon both sides.

As above stated, the apparatus is adapted more especially for the development of a continuous film, which usually contains about twelve exposures or negatives.

Figure 11:
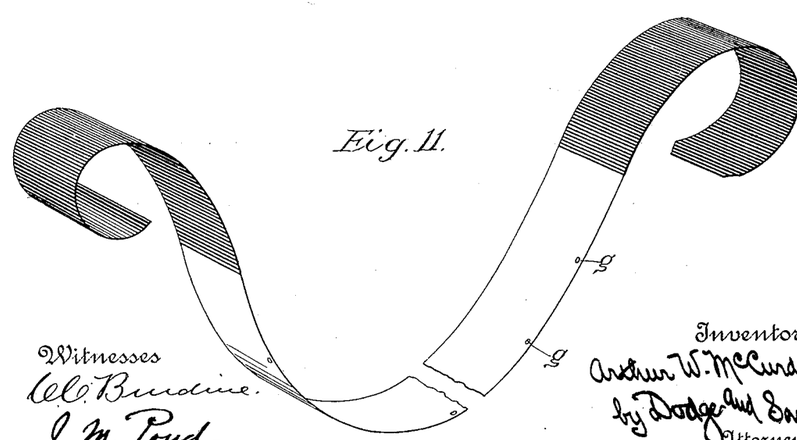
Fig. 11, a perspective view of a film such as I have used in the apparatus.

I have shown in the drawings in Fig. 11 a film which I have devised for use in this apparatus, though of course the apparatus is susceptible of use with the film or cartridge now upon the market, wherein the entire length of the film is provided with a backing sheet or strip of paper the ends of which project quite a distance beyond the end of the film, as is well understood. In the form shown in Fig. 11 I dispense with the backing-sheet and attach to each end of the film a strip of paper, one end of which is secured to the spool and the other surrounds the film after it has been wound about the spool. From this it will be seen that much of the backing-paper is dispensed with, and to provide for the necessary indication of the end of each exposure and also the registration of the film as it is passed from one spool to the other in the camera I form a series of openings or perforations $g$, placed at equal distances along the film, the perforations serving to actuate an indicating device carried by the camera. While this film may be used, still the apparatus herein set forth is capable of use with any form of film, whether the backing-paper is used or not. Such a film as is shown in Fig. 11 is also shown in connection with Figs. 2 and 3.

Figure 7:
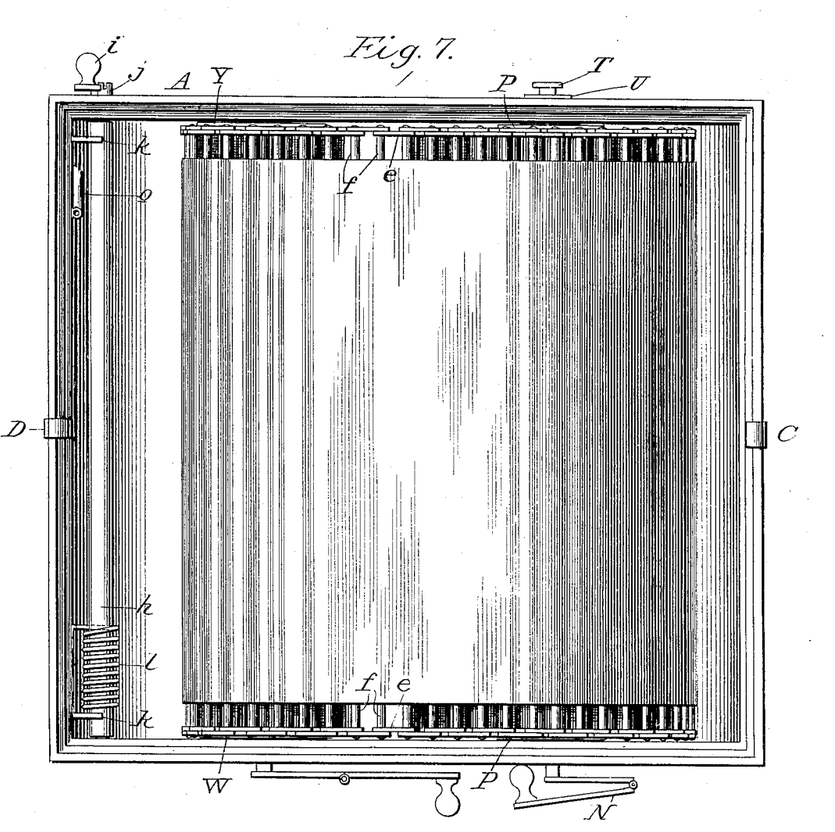
Fig. 7, a top plan view, the cover being removed, the film and the endless apron or carrier being shown as passing from one position to another.
Figure 9:
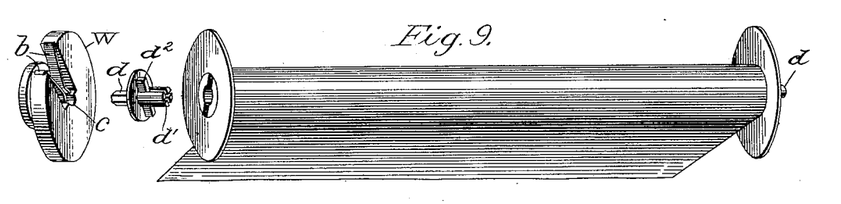
Fig. 9, a detached perspective view of a spool, one of the rotary heads or disks, and the stud axle or pin for connecting the two.
Figure 10:
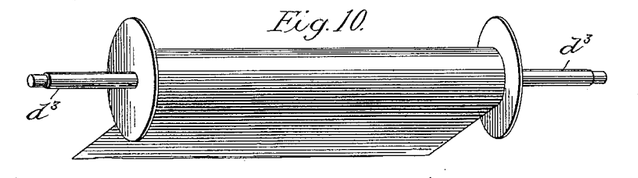
Fig. 10, a perspective view of a shorter cartridge or film and the axle which is employed in connection therewith to support it properly with relation to the mechanism.
Figure 15:
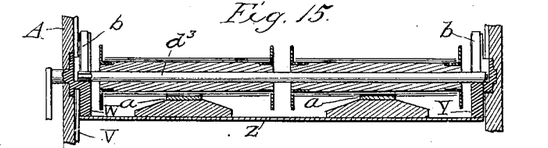

To provide a suitable support for the cartridge as the film is being wound with the apron around shaft M, I journal a shaft $h$ near the rear end of the box, as indicated in Figs. 2, 3, 4, 5, and 7. Said shaft has secured to it a lever $i$, which is normally in engagement with a stop or stud $j$, as indicated in Fig. 7. The shaft also carries two arms $k$, provided with seats or recesses near their outer ends for the reception of the ends of the stud-axles inserted in the end of the spool or for the reception of the end of an axle $d^3$, extending entirely through the length of the spool, as indicated in Fig. 10, this latter construction being used where a narrow film is to be treated. The stud-axle shown in Fig. 9 is provided with spring-tongues $d'$, adapted to enter the bore or opening in the end of the spool, and also with a cross member $d^2$ to enter the slot which is to be found in spools or cartridges as used today. A similar stud-axle is inserted in the opposite end of the spool, but is not provided with a cross-bar, for the reason that the opposite end of the spool or cartridge is not ordinarily provided with the cross-slot.

Where comparatively narrow films are to be developed, two of the spools or cartridges may be mounted on a single shaft and passed through the apparatus at the same time, the spring-catches $a$ being so arranged on the cross-bar Z as to embrace the spools when they are carried down by the arms $k$. Such an arrangement is illustrated in Fig. 15. A spring $l$ serves to turn the shaft and the attached arms $k$ down toward the bottom of the apparatus; but when the lever $i$ is in engagement with the stop $j$ said shaft is held in such position that the arms stand upright. When, however, it is desired to place a film in the apparatus for treatment, the supports for the spool or cartridge are placed within the recesses or seats formed in the outer ends of said arms $k$ and lever $i$ is sprung past the stop $j$, when the spring will tend to rotate the shaft and carry the arms, with the spool, down onto the apron into the position indicated in Fig. 2. When the parts are in this position, slide S is depressed and the pawl Q is withdrawn from its engagement with the teeth or recesses formed upon the shaft M. Said shaft will then be free to rotate by itself. The operator then passes the outer end of the paper down through the slot in said shaft, as indicated in Fig. 2, and places the cover on the apparatus. By a rotation of the crank in the direction indicated by the arrow in said Fig. 2 the paper is wound from around the film and about said shaft M. As soon as the paper has been entirely wound around the shaft, which fact can be ascertained by looking down through the eyepiece, the door L of course being open to admit the necessary light, the operator raises the plunger and the pawl Q is thrown into engagement with one of the recesses R formed about the shaft. The head P and the shaft will then be locked together, and a further rotation of the crank will cause the apron to wind around the head P and draw the film from off the cartridge or spool. The arms $k$, with the spool carried thereby, are kept down close to the apron as it unwinds from the rear heads or disks W and Y, so that the film is held closely to the apron or the cross-bars thereof and lies closely thereon throughout the entire length of the apron. When the film and apron or support are wound around or about the heads P as far as they can be, which position is shown in Fig. 3, then the operator moves the heads W and Y into the position indicated in Fig. 4, when the arms $k$ will pass down between the heads and carry the axle or support of the spool into the seats formed in said heads by the springs $b$ and the recess or depression $c$. The spool will also be embraced by the spring clips or clip $a$ and held against further rotation, so that by no possibility can the film become loose with relation to the apron or support. To further guard against any rotation of the spool independent of the apron or support, the stud-axles $d$ (shown in Fig. 9) are made polygonal in cross-section, so that the spring-arms $b$ will serve to clamp them much better than they would if the ends of said axles were cylindrical in cross-section. When the spool has been carried down into its proper position with relation to the heads or disks W and Y, the operator, by means of the lever $i$, elevates the arms $k$ into the position indicated in Figs. 5 and 7, springing the lever $i$ past the stop or stud $j$. The operator then turns the crank connected to the head W in the direction indicated by the arrow in Fig. 5, which causes the apron or support, with the film supported thereon, to be wound about the heads W and Y.

Figure 6:
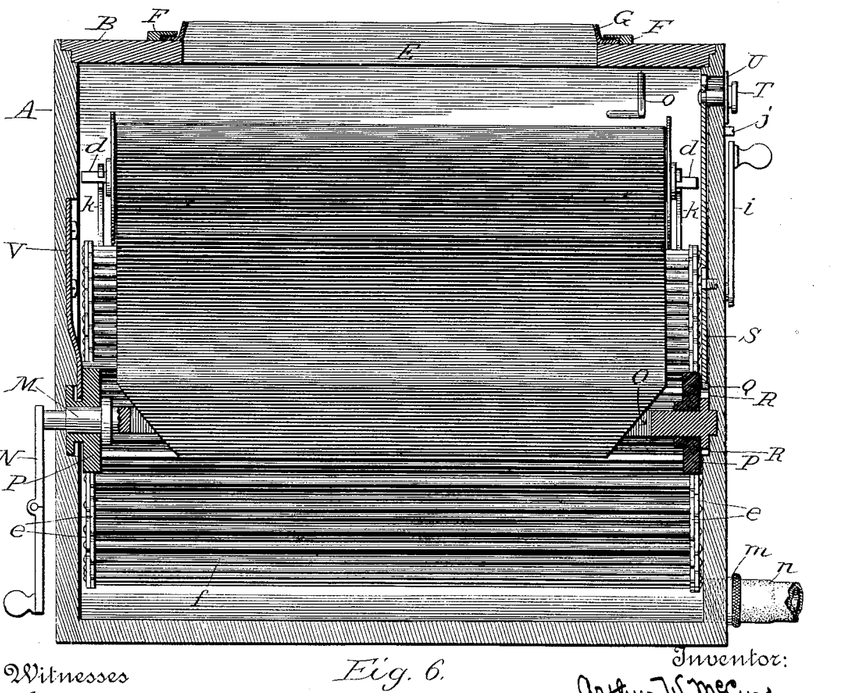
Fig. 6, a vertical sectional view taken on the line 1 1 of Fig. 2.

To provide for the introduction of the necessary liquids into the apparatus, a threaded opening $l'$ is formed in one side thereof near its base, as indicated in Figs. 3 and 6. Into this threaded opening I screw a coupling $m$, to which is attached a rubber or other flexible pipe or hose $n$.

It is of course necessary to provide an exit for the air contained in the box or apparatus when the reagents are introduced therein through the hose or pipe $n$, and to this end I employ a small tube $o$, bent upon itself so as to exclude the possibility of light entering therethrough and having one end opening out through the box near its upper edge. Said tube is shown in Figs. 2, 3, 6, and 7. Of course its location is immaterial so long as it in high enough to prevent any liquid from running out of the box when the apparatus is in use.

After the film and apron are wound up in the position indicated in Fig. 3 the operator introduces the reagents necessary to the development of the film through hose $n$, the quantity introduced being sufficient to cover the upper layer of the film and carrier. The operator may now rotate the film back and forth beneath the opening E and watch the development of the same through the eyepiece J, the light which comes in through the glass or glasses K in the front of the apparatus disclosing just how far the development has proceeded. After the desired development has been brought about the developing fluid is withdrawn and the other steps necessary to the complete fixing, washing, and treatment of the film are proceeded with as above. The operator then winds the apron or support, with the film thereon, around the shaft M, removes the cover of the apparatus, lifts the spool from the heads W and Y, and draws the film out of the apparatus, placing it upon any suitable support for drying the same.

It will be noted upon reference more particularly to Figs. 2 and 3 that the shaft M and the bearings for the heads W and Y are relatively close together. As the apron or support begins to wind around the heads P, carried by the shaft M, the diameter of that portion of the apron remaining around the heads W and Y will of course grow smaller, and for this reason it is not necessary to place the shaft and the points of support for said heads W and Y at such a distance apart as would be equal to twice the diameter of the apron when fully wound up. This enables me to make the casing of the apparatus comparatively small.

By winding the support, with the film thereon, about itself in the manner herein indicated the space occupied is relatively small and the whole surface of the film is acted upon simultaneously by the reagents employed. By making the support or apron in the manner herein set forth the liquids contained in the receptacle may pass freely around the film upon all sides thereof, and each and every portion will be acted upon alike. The constant winding and rewinding of the apron or support about itself serves to keep the reagents in motion and to do away with the necessity of rocking the box or otherwise agitating the liquids therein.

The cranks for rotating the shaft and the heads may be made removable, if so desired, and these, together with the tube G and the pipe $n$, may be placed wholly within the casing. When the parts are thus packed up, it is preferable to place a temporary slide over the opening E to prevent any of the parts from dropping out or any outside matter from getting into the apparatus. It is also preferable to screw a cap or plug into the opening $l'$ for the same reasons.

The material of which the entire apparatus or the body portion thereof may be made is immaterial so long as it is not affected by or does not affect the chemicals which are placed therein.

Figure 12:
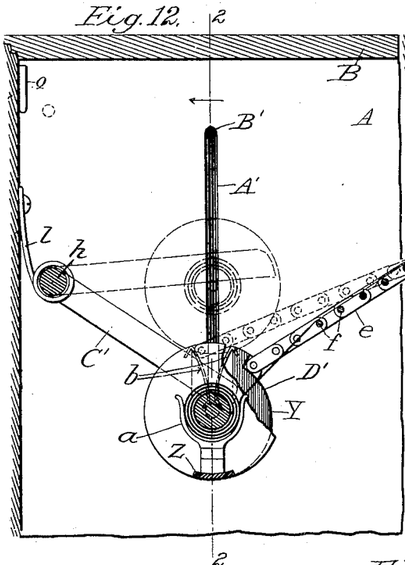
Figs. 12 and 13, detail views illustrating a modified construction for supporting the film or cartridge with relation to the apron and the rear support.
Figure 13:
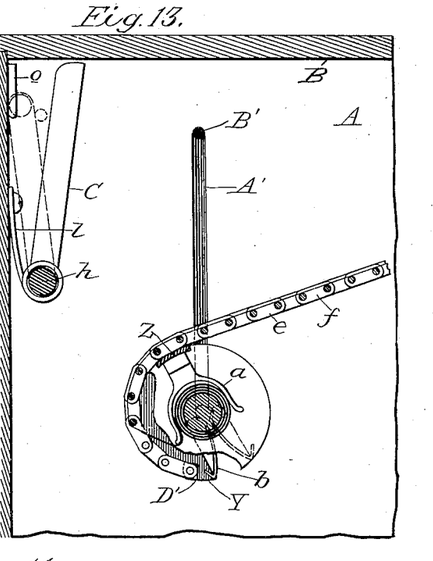
Figure 14:
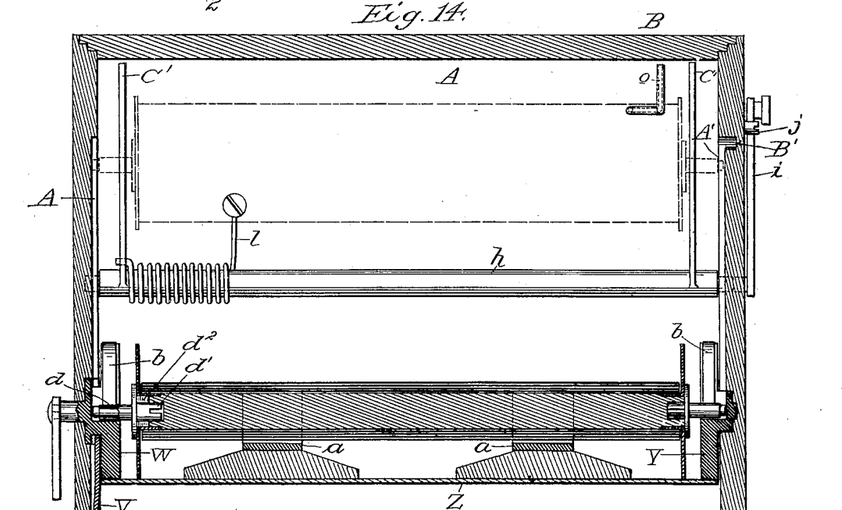
Fig. 14, a vertical sectional view on the line 2 2 of Fig. 12, and Fig. 15 a sectional view illustrating means for holding two short cartridges or films.

In Figs. 12, 13, and 14 I have illustrated a modified form of the means employed for holding the cartridge while the film is being drawn therefrom and for presenting the spool to the rotary heads or disks. As will be seen upon reference to said figures, a vertical slot or groove $A'$ is formed in each side of the box, the slots extending up from the disks or heads W and Y to a point slightly below the upper edge of the box. At the upper end of one of said slots there is made a depression $B'$, which permits the stud-axle carried by that end of the spool adjacent to the slot to be passed back therein to allow the opposite end of the spool, with its axle, to be passed down into the box in line with the slot. The spool is then given a slight endwise movement sufficient to draw the axle from out its recess $B'$ into the position shown in dotted lines in Fig. 14, when the spool will be free to drop down and rest upon the apron which is wound about the heads or disks W and Y. Instead of employing arms such as are shown in Figs. 2, 3, 4, and 5, I attach to the shaft $h$ arms $C'$, which are of such length as to reach out over the stud-axles of the spool no matter what may be the position thereof in the slot. The under face of each of the arms is smooth, so that as they are carried down by the shaft H and acted upon by the spring, as above described, they will tend to force the spool down upon the apron, and consequently hold the film in close proximity to the apron as it is wound upon the forward disks or axles. As in the other form, the spool will at all times be held down on the apron as the same is wound forward until the parts shall reach that position indicated in full lines in Fig. 12, whereupon the slots in the heads W and Y will stand in a vertical position in alinement with the slots or recesses $A'$. The said arms $C'$ will then force the spool or cartridge down to its place with reference to the heads or disks and the spring-catches $a$. This relation is shown in full lines in Fig. 12. As will also be seen upon reference to said Figs. 12 and 13, the apron is attached to the disks or heads in a manner slightly different from that indicated in Figs. 4 and 5—that is to say, said disks are cut away around a portion of their peripheries, forming a gradually-decreasing seat or recess $D'$. The end of the apron is attached to the disk at the deepest part of the seat or recess, (see Fig. 12,) and the relation of said recess to the slots in the disks is such that when the apron is completely wound about the forward disks it will bring the radial slots in the disks or heads W and Y into vertical alinement with the slots $A'$, formed in the side walls of the box or receptacle. After the spool is seated in the disks or heads W and Y and the clamps $a$ embrace the spool the operator rotates said disks and the spools carried thereby in the direction indicated by the arrow in Fig. 13, which will cause the apron to wind about the disks, the first portion of the apron seating itself in the recess formed about the disks, thus making the device more compact than in the forms illustrated in Figs. 2, 3, 4, and 5, where of necessity a slight space will be left between the periphery of the disks and the first layer of the apron passing thereabout.

To permit the spool or cartridge to pass down freely between the heads W and Y with the construction shown in Figs. 12 and 13, the first few links are simply riveted together without the cross-bars.

While it is advantageous to use the inspection-tube G, it is of course not necessary to the working of the apparatus, as any form of inspection-opening may be employed.

While I have shown the flexible apron or support mounted within a box or closure which is provided with a cover, it is of course apparent that the flexible apron or support may be used in an ordinary dark room, as it forms a very convenient means for handling the film. It is likewise preferable to mount the apron or support in such manner that the reagents used in developing the film may come into contact with every portion thereof.

Having thus described my invention, what I claim is—

1. In a portable apparatus for developing flexible photographic films, the combination of a suitable box or receptacle closed against actinic rays; and a flexible open apron or support mounted wholly within said receptacle and adapted to receive and hold a flexible photographic film.

2. In a portable apparatus for developing photographic films, the combination of a suitable box or receptacle closed against actinic rays; and a flexible apron or support mounted wholly therein and adapted to receive and support a flexible photographic film.

3. In a portable apparatus for developing flexible photographic films, the combination of a suitable box or receptacle closed against actinic rays; a flexible apron mounted wholly therein and adapted to receive and hold a flexible photographic film; and means for permitting the necessary reagents used in the process of development to circulate in and about the apron and around the film supported thereon.

4. In a portable apparatus for developing flexible photographic films, the combination of a suitable box or receptacle closed against actinic rays; an apron or support mounted therein; means for winding said apron or support about itself; and means for holding a flexible photographic film upon said support with its sensitized face out of contact with itself and said support.

5. In a portable apparatus for developing flexible photographic films, the combination of a suitable box or receptacle closed against actinic rays; means mounted within said box for winding the film about itself; and means for reversing the direction of movement of the film and winding it about itself in the opposite direction.

6. In an apparatus for developing photographic films, the combination of a suitable box or receptacle closed against actinic rays; a flexible apron mounted therein; means for winding said apron about itself; means for holding a film thereon with its sensitized face out of contact with itself and the apron; and means for winding said apron and the film in the reverse direction, substantially as described.

7. In an apparatus for developing photographic films, the combination of a suitable box or receptacle closed against actinic rays; a flexible apron mounted therein; means for winding said apron about itself; and means for holding a cartridge or film down in close contact with the apron, substantially as and for the purpose described.

8. In an apparatus for developing photographic films, the combination of a suitable box or receptacle closed against actinic rays; a flexible apron mounted therein; means for winding said apron about itself; means for carrying a cartridge and holding it down in close contact with the apron as the apron is wound up with the film thereon; and a rotatable support for the cartridge-spool, substantially as described.

9. In an apparatus for developing photographic films, the combination of a suitable box or casing closed against actinic rays; a flexible apron mounted therein; means for winding said apron about itself in both directions; a spring-actuated follower serving to hold a cartridge down in close contact with the apron; and a rotatable support for the cartridge-spool.

10. In an apparatus for developing photographic films, the combination of a suitable box or receptacle closed against actinic rays; a shaft journaled therein; a flexible apron; means for detachably connecting one end of said apron to said shaft; and rotary devices also mounted within said box and connected to the other end of the apron, substantially as and for the purpose described.

11. In an apparatus for developing photographic films, the combination of a suitable box or receptacle closed against actinic rays; a shaft rotatably mounted therein; a flexible apron also mounted within said receptacle and detachably connected at one end to said shaft; means for locking said shaft and apron together; rotary devices also mounted in the receptacle and connected to the opposite end of the apron; and a spool-support carried by said rotary devices.

12. In an apparatus for developing photographic films, the combination of a suitable box or receptacle closed against actinic rays; a shaft journaled therein; a flexible apron mounted within said box and detachably connected to said shaft; means for locking the shaft and apron together; rotary devices also mounted within the box and connected to the opposite end of the apron; a spool-support carried by said rotary devices; and a spring-actuated device also mounted within the casing and adapted to hold the spool down upon the apron as said apron is wound around the shaft, substantially as described.

13. In an apparatus for developing photographic films, the combination of a suitable box or receptacle closed against actinic rays; a slotted shaft rotatably mounted therein; disks or heads mounted upon said shaft; means for locking one of said disks to the shaft; a flexible apron connected to said disks; rotary devices also mounted within said box and connected to the opposite end of said flexible apron; spool-supports carried by said rotary devices; and a spring-actuated follower mounted within the box and adapted to hold the spool and film down in close contact with the flexible apron as it is wound about the shaft.

14. In an apparatus for developing photographic films, the combination of a suitable box or receptacle closed against actinic rays; a slotted shaft rotatably mounted therein; disks mounted upon said shaft; means for locking one of said disks to the shaft; a flexible apron connected to said disks; disks W, Y, rotatably mounted in the sides of said box or receptacle; connections between said disks and one end of the apron; a cross-bar connecting said disks; and a spring-clasp $a$ mounted upon said cross-bar.

15. In an apparatus for developing photographic films, the combination of a suitable box or receptacle closed against actinic rays; a slotted shaft rotatably mounted therein; disks carried upon said shaft; means for locking one of said disks to said shaft; a flexible apron connected at one end to said disks; disks W and Y rotatably mounted in the side of said box in rear of the shaft; connections between said disks and one end of the apron; spring-retaining devices carried by said disks; and a spring-actuated follower for holding a cartridge or film in close contact with the apron as it is wound about the disks carried by the shaft.

16. In an apparatus for developing photographic films, the combination of a suitable box or receptacle provided with a removable cover; a tube G adapted to be mounted over an opening therein; an eyepiece carried at the upper end of the tube and provided with suitable actinic-proof material; and an actinic-proof window formed in the forward face of the box.

17. In an apparatus for developing photographic films, the combination of a suitable box or receptacle closed against actinic rays; means mounted within said box for holding a film; a draw-off provided at the lower side of the box; a vent-tube extending from the interior of the box to the outer face thereof; and inspection-openings formed in the walls of the box, substantially as described.

18. In an apparatus for developing photographic films, the combination of a suitable box or receptacle closed against actinic rays; a flexible apron mounted therein; means for winding said apron about itself; and means for supporting two films side by side upon said apron and holding them in such position, substantially as described.

19. In an apparatus for developing photographic films, the combination of a suitable box or receptacle closed against actinic rays; a flexible apron mounted therein; means mounted within the box for removing and winding up the light-proof covering from a photographic film; and means for winding up the apron and withdrawing the film from its spool onto said apron, substantially as described.

20. In a portable apparatus for developing flexible photographic films, the combination of a suitable box or receptacle closed against actinic rays; means contained within said box for holding a flexible photographic film in an extended position therein; and means for subjecting the entire film at one and the same time to the necessary reagents for its development.

21. In a portable apparatus for developing flexible photographic films, the combination of a suitable box or receptacle closed against actinic rays; means contained within said box for holding a flexible film in separated layers; and means for subjecting the entire film at one and the same time to the necessary reagents for its development.

22. In a portable apparatus for developing flexible photographic films, the combination of a suitable box or receptacle closed against actinic rays; means contained within said box for holding a flexible film in an extended position in a series of separated layers; and means for subjecting the entire film at one and the same time to the necessary reagents for its development.

23. In a portable apparatus for developing flexible photographic films, the combination of a box or receptacle closed against actinic rays; means for unrolling wholly within said closed receptacle a flexible photographic film or cartridge placed therein; and means for submitting the film to the necessary reagents for its development.

24. In a portable apparatus for developing flexible photographic films, the combination of a suitable box or receptacle closed against actinic rays; means for withdrawing wholly within said receptacle the protecting-covering from a flexible photographic film or cartridge placed within the box and unwinding the film; and means for submitting the film to the necessary reagents for its development.

25. In a portable apparatus for developing flexible photographic films, the combination of a suitable box or receptacle closed against actinic rays; an apron or support provided with raised edges mounted therein; means actuated from without the box for winding said apron or support about itself within said box; and means also actuated from without the box for winding the apron or support in a reverse direction, substantially as described.

26. In a portable apparatus for developing flexible photographic films, the combination of a suitable box or receptacle closed against actinic rays, and a flexible apron or support mounted therein and provided with raised edges, adapted and designed to receive and support a flexible photographic film.

27. In a portable developing apparatus for flexible photographic films, the combination of a suitable box or receptacle closed against actinic rays; means contained therein for supporting a flexible photographic film; and means for admitting the necessary reagents for the development of the film and permitting the escape of air from the box, substantially as described, whereby the film and the reagents employed are practically out of contact with the atmosphere.

28. In a portable developing apparatus for flexible photographic films, the combination of a suitable box or receptacle closed against actinic rays; means for supporting a flexible photographic film therein; an air-vent for said box; and means for introducing into said closed box the necessary reagents for carrying out the development of the film, whereby the air contained within the box or receptacle will be driven out, and the process of development will be carried on in the absence of air.

29. In a portable developing apparatus for flexible photographic films, the combination of a suitable box or receptacle closed against actinic rays; means for admitting the necessary reagents for the development of the flexible film and permitting the escape of air from said box or receptacle; and means for supporting and moving the flexible film through the reagents within said closed receptacle, substantially as and for the purpose described.

30. In a portable apparatus for developing flexible photographic films, the combination of a suitable box or receptacle closed against actinic rays, and having an inspection-opening formed therein; and means substantially such as described contained within said box for supporting and holding a flexible photographic film.

31. In a portable apparatus for developing flexible photographic films, the combination of a suitable box or receptacle closed against admission of actinic rays; and means actuated from without the box for exposing a flexible photographic film placed therein to the action of reagents for its development, substantially as described.

In witness whereof I hereunto set my hand in the presence of two witnesses.

ARTHUR W. McCURDY.

Witnesses:
HORACE A. DODGE,
C. C. BURDINE.